G. W. HAZEL.
LOCKING NUT.
APPLICATION FILED MAY 13, 1913.
1,242,689.
Patented Oct. 9, 1917.
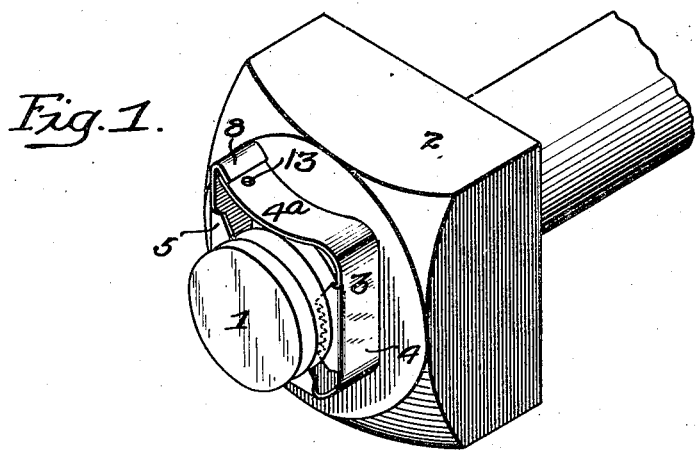
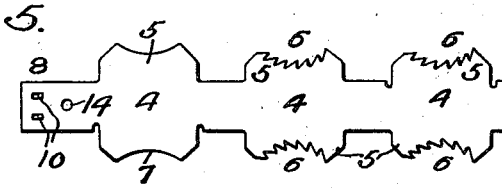
Witnesses
Walter Chism
William T Nase
Inventor
George W. Hazel
by his Attorneys
Howson & Howson

UNITED STATES PATENT OFFICE.

GEORGE W. HAZEL, OF CAMDEN, NEW JERSEY, ASSIGNOR, BY MESNE ASSIGNMENTS, TO HAZEL SAFETY NUT COMPANY, OF PHILADELPHIA, PENNSYLVANIA, A CORPORATION OF DELAWARE.

LOCKING-NUT.

1,242,689.      Specification of Letters Patent.      Patented Oct. 9, 1917.

Application filed May 13, 1913. Serial No. 767,351.

*To all whom it may concern:*

Be it known that I, GEORGE W. HAZEL, a citizen of the United States, and a resident of Camden, Camden county, New Jersey, have invented certain Improvements in Locking-Nuts, of which the following is a specification.

My invention relates to means which may be employed for retaining nuts in place; and one object of my invention is to provide a structure adapted to engage the threads of a bolt beyond the nut carried thereby; such structure lying in contact with the nut and exerting such a frictional hold upon the threads of the bolt and the surface of the nut as to resist any tendency of the nut to back off or move on the threads of the bolt.

A further object of my invention is to provide a structure which may be employed not only as a nut retaining device or lock, but also as a spring lock-nut, temporarily or otherwise, for direct engagement with the threads of a bolt employed for holding a plurality of parts together, either temporarily or permanently.

These and other features of my invention are more fully described hereinafter, reference being had to the accompanying drawings, in which:

Figure 1, is a perspective view illustrating one manner of employing the spring lock-nut forming the subject of my invention;

Fig. 2, is a perspective view of the spring lock-nut open and detached from a bolt;

Fig. 3, is a view in elevation of the spring lock-nut, showing the same applied to a bolt; the latter being in section;

Fig. 4, is a sectional view illustrating a detail of the spring lock-nut forming the subject of my invention;

Figs. 5 and 6, are views of partially prepared blanks from which my improved spring lock-nut or retaining device may be formed;

Fig. 7, is a view of a tool which may be employed in using the spring lock-nut, and Figs. 8, 9, 10 and 11, are views illustrating modified constructions within the scope of my invention.

The structure forming the subject of my invention comprises an open, separable, spring-walled shell designed to exert sufficient friction upon the threads of a bolt with which it may be employed as a temporary nut, or in some instances as a complete retaining device, or to lie in contact with a nut adapted to such bolt so as to insure that the nut will be held against backing off or turning.

In the drawings, 1 represents a bolt; 2 a nut upon the same, and 3 a nut retaining device made in accordance with my invention. This is preferably made of a flat piece of metal, steel being preferred, and is substantially quadrangular in shape, comprising walls 4 with turned edges or struck-up portions 5; some of which may be provided with serrations forming teeth, as indicated at 6, while others may be plain, as indicated at 7. One of the sides 4 is provided with a hook portion 8, while another side 4$^a$ is elongated and without turned or struck-up edges, forming a spring tongue adapted to engage the hook portion 8 whereby the structure may be clamped or locked to a bolt. By preference, the tongue may have one or more apertures 9 adapted to be engaged by one or more projections 10 formed on the inturned portion of the hook member. If desired, this arrangement may be reversed.

The spring lock-nut may be clamped on a bolt by means of a special tool shown in Fig. 7, having prongs 11 and 12 at one end with end portions 11$^a$ and 12$^a$ to engage apertures 13 and 14 formed in the hooked and tongue sides of the locking nut.

Instead of turning over the edges of the walls 4 as indicated in Figs. 1, 2, 3, *et seq.*, the walls may have projections struck up from the same intermediate the edges and arranged to engage the threads of a bolt, as shown in Figs. 8 and 9.

Various means of clamping or connecting together the walls of the shell forming the locking nut or retaining device may be employed, and in Figs. 10 and 11, I have shown modified constructions. In the form shown in Fig. 10, two sides 4$^b$ of the nut retaining device are provided with hook portions, and the same are engaged by a key clamp 15. In the structure shown in Fig. 11, two sides 4$^c$ are also provided with hook portions which are reversed with respect to the hook portions shown in Fig. 10, and a key in the form of a nail or pin 16 may be employed to hold the same in a locked position.

In practice, the retaining device may be placed upon the bolt in an open condition, and then turned down on the threads until it is in contact with the surface of the parts to be connected or a nut. Then by means of the special tool having suitable prongs 11 and 12, shown in Fig. 7, the parts are brought together so as to clamp the structure around and against the bolt, and if necessary it is turned down to a firm seating against the nut or other surface. In such position, sufficient frictional contact is exerted, by reason of the springy nature of the walls of the structure, to hold the locking nut against movement, and movement of the locking nut retaining device is prevented by reason of the toothed portion 5 engaging the threads of the same.

The retaining device may be separated by use of the prongs 17 and 18 having ends 17ª and 18ª for engagement with the apertured walls of the locking nut, of the tool shown in Fig. 7; the effect of the use of such tool being to spring the tongue part away from the hook portion.

The projections or struck-up portions 5 carried by the strips of spring metal from which the spring lock-nuts are formed may be disposed at the edges of the walls forming the sides of the latter, as shown in Fig. 5, or they may be pressed up from the said walls intermediate the edges of the same, as indicated at 5ª in Fig. 6. In either instance, these projections or struck-up portions, when the strips are bent to form the hollow spring lock-nuts, should be so disposed in different planes as to form in substance a thread to follow the threads of the bolt and at the same time the lock-nut should present a substantially flat face for engagement with a nut, or with the surface of the structure against which such spring lock-nut abuts.

In addition to the modifications shown in Figs. 10 and 11, I may form a substantially rectangular structure such as shown in Fig. 8, the spring tongue 4ᵈ of which may be of such shape as to engage the bolt, and if desired such tongue may be provided with a struck-up portion 5ª, intermediate its side edges, to engage between the threads of the bolt.

In Fig. 9 I have shown a hexagonal structure having another form of tongue 4ᵉ which, in this instance may also be provided with a mid projection or struck up portion 5ª. It will be understood, of course, that in some instances, the shell-like lock-nut may be without angular faces and be substantially or practically round.

The pressure developed in connecting the locking nut in operative position around a bolt is developed by the tool pressing the tongue portion into engagement with the hook portion; such tongue being so constructed as to respond to the tension applied by the tool and draw against the bolt all of the projecting portions of the several sides of the nut, and when in final connected position, to engage the outer surface of the threads under such tension as to insure that all of the other parts are firmly held in sufficient frictional contact with the bolt as to prevent backing off of the said nut. This will be readily understood upon reference to the drawings, which clearly illustrate the position the tongue must assume before it is finally brought into locking engagement with the hook portion. In addition, the pressure exerted by the spring tongue is augmented by reason of the serrated projections which bite into the threads of the bolt when there is any tendency of backward movement by said lock-nut.

It will be understood, of course, that while I have shown various embodiments of my invention, I do not wish to be limited in any way to the precise constructions shown; except as required by the scope of the appended claims.

I claim:

1. A lock nut comprising a section of sheet metal bent into a hollow shell of substantially polygonal form, said structure having its sides formed with inwardly projecting portions having bolt-engaging surfaces, said surfaces being at substantially equal distances from the geometrical center of the lock nut and a plurality of said portions including the one on a side adjacent one of the ends of the section, formed to have threaded engagement with the bolt, and means for connecting the ends of the section to contract all of the sides of the same and the inwardly projecting portions thereof.

2. A lock nut comprising a section of sheet metal bent into a hollow shell of substantially polygonal form, said structure having a plurality of its sides formed with inwardly projecting portions having bolt-engaging surfaces, said surfaces being at substantially equal distances from the geometrical center of the lock nut and a plurality of said portions including the one on a side adjacent one of the ends of the section, formed to have threaded engagement with the bolt, and means for connecting the ends of the section to contract all of the sides of the same and the inwardly projecting portions thereof; one of said inwardly projecting portions having teeth.

3. A lock nut comprising a section of sheet metal bent into a hollow shell of substantially polygonal form, said structure having a plurality of its sides formed with inwardly projecting portions having bolt-engaging surfaces, said surfaces being at substantially equal distances from the geometrical center of the nut lock and a plurality of said portions including the one on a side adjacent one of the ends of the section being disposed in different planes for threaded engagement with the bolt, and means for connecting the ends of the section to contract all of the sides of the same and the inwardly projecting portions thereof.

4. A lock nut comprising a section of sheet metal bent into a hollow shell of substantially polygonal form, said structure having its sides formed with inwardly projecting portions intermediate the ends of said sides having bolt-engaging surfaces, said surfaces being at substantially equal distances from the geometrical center of the lock nut and a plurality of said portions including the one on a side adjacent one of the ends of the section, formed to have threaded engagement with the bolt, and means for clamping the ends of the section to contract all of the sides of the same and the inwardly projecting portions thereof; one of said inwardly projecting portions having teeth.

5. A lock nut comprising a section of sheet metal bent into a hollow shell of substantially polygonal form, said structure having a plurality of its sides formed with inwardly projecting portions having bolt-engaging surfaces, said surfaces being at substantially equal distances from the geometrical center of the lock nut and a plurality of said portions including the one on a side adjacent one of the ends of the section, formed to have arcuate threaded engagement with the bolt, and means for clamping the ends of the section to contract all of the sides of the same and the inwardly projecting arcuate engaging portions thereof.

6. A lock nut comprising a section of sheet metal bent into a hollow shell of substantially polygonal form, said structure having a plurality of its sides formed with inwardly projecting portions having bolt-engaging surfaces, said surfaces being at substantially equal distances from the geometrical center of the lock nut and a plurality of said portions including the one on a side adjacent one of the ends of the section being disposed for threaded engagement with the bolt, and means for connecting the ends of the section to contract all of the sides of the same and the inwardly projecting portions thereof; said bolt-thread-engaging portions defining a circle of less diameter when the ends of said strip are connected.

7. The combination with a threaded bolt and a nut therefor, of a retaining device for said nut, said retaining device being carried by the bolt and comprising a strip of spring metal bent substantially into a hollow shell of polygonal form, said strip having coöperative securing means carried by its ends, and inwardly disposed projections carried by its walls intermediate their ends for threaded engagement with the threads of said bolt, said strip including an integral spring wall in surface contact with the threads of the bolt for applying inward pressure to all contacting portions of the retaining device when the latter is in its connected and contracted position.

8. The combination with a threaded bolt and a nut therefor, of a retaining device for said nut, said retaining device being carried by the bolt and comprising a strip of spring metal bent substantially into a hollow shell of polygonal form, said strip having coöperative securing means carried by its ends, and inwardly disposed projections carried by its walls intermediate their ends for threaded engagement with the threads of said bolt, said strip including an integral spring wall in surface contact with the threads of the bolt for applying inward pressure to all contacting portions of the retaining device when the latter is in its connected and contracted position, and one of the inwardly disposed projections having teeth for biting engagement with the bolt between threads of the same.

9. A nut lock comprising a sheet or strip of metal bent to polygonal form, having a plurality of its sides, including the end sides, formed with bolt engaging portions and its ends adapted to be clamped together to thus contract the nut lock and to bind the same into frictional contact with a bolt and when in such position a plurality of the bolt engaging portions being substantially the same distance from the axis of the bolt hole therein.

10. The combination with a bolt, of a lock nut formed of a strip of sheet metal bent substantially into a shell of hollow polygonal form adapted to said bolt, said hollow shell having a plurality of its sides, including one end side, formed with inwardly projecting thread-engaging portions; and means for interlocking the ends of the strip forming said shell to thus contract the same and bind the thread-engaging portions of the shell into frictional engagement with said bolt; all of the sides of said lock nut contacting with the bolt when in use.

11. The combination with a threaded bolt, of a lock nut comprising a sheet or strip of metal bent to polygonal form to encircle the bolt, the walls of said lock nut being formed with portions for threaded engagement with the threads of the bolt, and means for connecting the free ends of said strip, certain of said engaging portions extending inwardly beyond the periphery of the bolt and maintaining the walls of the lock nut out of contact with the threads of the bolt.

12. The combination with a threaded bolt, of a nut adapted to said threads, and locking means comprising a sheet or strip of metal bent to polygonal form to encircle the bolt, the walls of said lock nut being formed with portions for threaded engagement with the threads of the bolt and having a face for engagement with the nut carried by the bolt, with means for connecting the free ends of said strip, certain of said engaging portions extending inwardly beyond the periphery of the bolt and maintaining the walls of the lock nut out of contact with the threads of the bolt.

13. The combination with a threaded bolt, of a lock nut comprising a sheet or strip of metal bent to form an annularly walled shell to encircle the bolt, the walls of said shell having a plurality of separated and inwardly projecting portions for threaded engagement with the threads of the bolt, and means for interlocking the free ends of the strip to bring said inwardly projecting engaging portions into gripping engagement with the bolt.

14. The combination with a threaded bolt, of a lock nut consisting of a sheet or strip of metal bent into a shell substantially square in form to encircle the bolt; said lock nut having three of its sides, including one terminal or end side, formed with inwardly projecting portions for threaded engagement with the threads of the bolt; the ends of said strip being secured together to contract the walls of the shell and bind the engaging portions into frictional engagement with the bolt.

15. The combination with a threaded bolt, and a nut carried thereby, of locking means for said nut consisting of a sheet or strip of metal bent into a hollow shell of polygonal form to encircle the bolt and having a face for engagement with said nut; said shell having a plurality of its sides, including one terminal or end side, formed with inwardly projecting portions for threaded engagement with the threads of the bolt, and the ends of the strip forming said shell being clamped together to contract the walls of the shell and bind the engaging portions into frictional engagement with the bolt.

In testimony whereof, I have signed my name to this specification, in the presence of two subscribing witnesses.

GEORGE W. HAZEL.

Witnesses:
 MURRAY C. BOYER,
 WM. A. BARR.